3,641,068
17α-(2 - ALKYNYL)-7α - METHYLESTRA-1,3,5(10)-TRIENE - 3,17β - DIOLS AND ESTERS CORRESPONDING
Paul D. Klimstra, Northbrook, Ill., assignor to G. D. Searle & Co., Chicago, Ill.
No Drawing. Filed Jan. 31, 1969, Ser. No. 795,702
Int. Cl. C07c 169/08
U.S. Cl. 260—397.5
6 Claims

ABSTRACT OF THE DISCLOSURE

The conversion of 3-hydroxy-7α-methylestra-1,3,5(10)-trien-17-one to a suitable derivative, wherein the 3-hydroxy group is protected, followed by reaction of that derivative with a 2-alkynyl magnesium halide and cleavage of the protecting group affords 17α-(2-alkynyl)-7α-methylestra-1,3,5(10)-triene-3,17β-diols. The corresponding esters are produced by reaction with a lower alkanoic acid anhydride or halide. These novel compounds are valuable pharmacological agents, e.g. deciduogenic, anti-estrogenic, anti-fertility and pepsin-inhibitory.

---

The present invention is concerned with novel steroidal chemical compounds belonging to the estra-1,3,5(10)-triene family and characterized by a 7α-methyl function. These compounds are, more particularly, 17α-(2-alkynyl)-7α-methylestra-1,3,5(10)-triene-3,17β-diols and the corresponding esters represented by the following structural formula

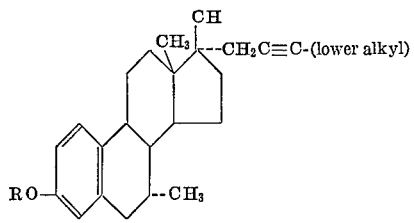

wherein R and R' can be hydrogen or a lower alkanoyl radical.

The lower alkyl radicals depicted in the foregoing structural formula are typified by methyl, ethyl, propyl, butyl, pentyl, heptyl and the branched-chain groups isomeric therewith.

Representative of the lower ankanoyl radicals denoted by the R and R' terms in that structural representation are formyl, acetyl, propionyl, butyryl, valeryl, caproyl, heptanoyl and the corresponding branched-chain isomers.

The instant novel compounds are conveniently produced by processes which utilize 3-hydroxy-7α-methylestra-1,3,5(10)-trien-17-one as the starting material. The initial step involves protection of the 3-hydroxy substituent by a function which can readily be removed at the desired time. A particularly convenient protecting group is the tetrahydropyran-2-yl moiety. 3-hydroxy-7α-methylestra-1,3,5(10)-trien-17-one is thus contacted with dihydropyran in the presence of p-toluenesulfonic acid to yield 7α - methyl - 3 - tetrahydropyran - 2' - yloxyestra-1,3,5(10)-trien-17-one. Introduction of the 17α-(2-alkynyl)-17β-hydroxy moiety is accomplished by reaction with a 2-alkynyl magnesium halide. 7α-methyl-3-tetrahydropyran-2'-yloxyestra-1,3,5(10-trien-17-one, for example, is allowed to react with 2-butynyl magnesium bromide, thus affording 17α - (2 - butynyl)- 7 α - methylestra-1,3,5(10)-triene-3,17β-diol 3-tetrahydropyran-2'-yl ether. Cleavage of the protecting group is conveniently achieved by reaction with p-toluenesulfonic acid at room temperature. In that manner, the aforementioned 17α-(2-butynyl)-7α-methylestra-1,3,5(10)-triene-2,17β-diol 3-tetrahydropyran-2'-yl ether is converted to 17α-(2-butynyl)-7α-methylestra-1,3,5(10)-triene-3,17β-diol.

The instant esters are readily obtained by reaction of the corresponding diols with a lower alkanoic acid anhydride or halide, preferably in the presence of a suitable acid acceptor, e.g. pyridine or triethylamine. The reaction of 17α - (2 - butynyl)-7α-methylestra-1,3,5(10)-triene-3,17β-diol, for example, with acetic anhydride in the presence of pyridine results in 17α-(2-butynyl)-7α-methylestra-1,3,5(10)-triene-3,17β-diol 3-acetate, while the corresponding 3,17-diacetate is obtained when that process is conducted at elevated temperatures.

The compounds of this invention are useful as a result of their valuable pharmacological properties. They are, for example, hormonal and anti-hormonal agents as is evidenced by their deciduogenic, anti-estrogenic and anti-fertility activity. They are also pepsin-inhibitory agents.

The anti-fertility property of the instant compounds is specifically illustrated by the activity of 17α-(2-butynyl)-7α-methylestra-1,3,5(10)-triene-3,17β-diol 3-acetate when tested in the assay described by Edgren et al., Fertility and Sterility, 12, 172 (1961). In that assay a group of 5 sexually mature female rats, weighting approximately 190 g. each, is mated and, beginning on the first day that sperm appear in the vagina, in injected once daily for a period of 7 days with the selected dose of the test compound dissolved or suspended in 0.1 ml. of corn oil. A dose of 4 mg. is usually employed. During the same period of time a similar group of control rats is injected with corn oil alone. On the fifteenth day after commencement of treatment the animals are sacrificed and the uteri are inspected for placentation sites. A rat exhibiting one or more normal appearing placentation sites is classified as pregnant. A compound is designated active if it inhibits pregnancy in at least 50% of the rats.

Illustrative of the anti-estrogenic property of the compounds of the present invention is the activity of 17α-(2-butynyl)-7α-methylestra-1,3,5(10)-triene-3,17β-diol 3-acetate when tested in the assay described by Edgren and Calhoun, Proc. Soc. Exp. Biol. Med., 94, 537 (1957). The details of that assay are as follows:

Groups of 8–10 immature female mice are injected once daily for a period of 3 days with 0.1 ml. of a corn oil solution containing 0.1 mcg. of estrone together with ⅓ of the selected dose of the test compound. A total dose of 1 mg. is usually employed. 24 hours after the final injection the animals are sacrificed and their uteri are removed, cleaned and weighed. The uterine weights are compared with those of a similar group of control animals receiving injections of corn oil containing only 0.1 mcg. of estrone. A compound is designated active if it produces a uterine esponse significantly smaller ($P \leq 0.01$) than control values.

The deciduogenic property of the instant compounds is evidenced by the activity of a representative compound, i.e. 17α - (2 - butynyl) - 7α - methylestra-1,3,5(10)-triene-3,17β-diol 3-acetate, when assayed by the following method:

Intact immature female rats weighing about 1 kg. are primed with 5 mcg. subcutaneous injections of estradiol-17β on each of 6 successive days. Compounds, dissolved or suspended in corn oil, are administered daily for 8 days, starting on the day following the last priming injection. A daily dose of 10 mg. of the test compound is normally employed. A control group is treated with the vehicle alone. On the day after the last injection the animals are sacrificed and a segment of the uterus is taken for histological examination. The appearance of decidual cells in the uterus is used as an index of deciduogenic activity.

Inhibition of the enzymatic activity of pepsin is illustrated by the activity of 17α-(2-butynyl) - 7α - methylestra-1,3,5(10)-triene-3,17β-diol 3-acetate when tested in the following assay:

The technique employed is a modification of that described by M. L. Anson in J. Gen. Physiol., 22, 79 (1938) and is dependent upon the fact that the proteolysis of hemoglobin results in liberation of peptides containing tyrosine and tryptophane units characterized by an absorption band in the ultraviolet spectrum at 275 millimicrons. Absorption at this wave length serves therefore as an index of the extent to which the proteolysis has occurred. Each test is carried out in 4 test tubes to which are added solutions, measured in ml., of hemoglobin, pepsin, compound, hydrochloric acid and perchloric acid. The additions are made immediately before and immediately before and immediately after simultaneous incubation at 37° in accordance with the schedule shown in the table.

TABLE

| Test tube No. | Addns. at 0 time | | | | Addns. after 2 hours at 37° | | |
|---|---|---|---|---|---|---|---|
| | HGB | PEP | CPD | HCl | CPD | HCl | HClO₄ |
| 1 | 5 | 1 | | 1 | 1 | | 1 |
| 2 | 5 | 1 | | 1 | 1 | | 1 |
| 3 | 5 | 1 | 1 | | | 1 | 1 |
| 4 | 5 | 1 | 1 | | | 1 | 1 |

The hemoglobin solution (HGB) is prepared by mixing 60 g. of hemoglobin substrate powder (bovine) [Worthington Biochemical Corporation, Freehold, N.J.] with 2000 ml. of double distilled water, successively filtering and centrifuging the resulting slurry, adjusting the pH of the saturated solution thus separated to 2.0 with 6 N hydrochloric acid, and finally diluting with an equal volume of pH 2.0 hydrochloric acid, prepared as described below. The pepsin solution (PEP) is prepared by dissolving 4.0 mg. of 3X crystallized pepsin (hog) [Pentex, Incorporated, Kankakee, Ill.] in 200 ml. of pH 2.0 hydrochloric acid and diluting 6.25 ml. of the resulting solution with a further quantity of pH 2.0 hydrochloric acid q.s. 25 ml. The compound solution (CPD) is prepared by mixing 5 mg. of compound with 5.0 ml. of pH 2.0 hydrochloric acid and filtering out any material which remains insoluble. The hydrochloric acid solution (HCl) is prepared by diluting concentrated hydrochloric acid to pH 2.0 with double distilled water. The perchloric acid is prepared by diluting concentrated perchloric acid with double distilled water q.s. 20% by volume. When the additions after incubation have been completed, the contents of each tube is filtered to remove undigested protein precipitated by the perchloric acid (which also serves to inactivate the enzyme), 1 ml. of each filtrate is diluted with 10 ml. of pH 5 sodium acetate buffer and the resulting solutions are subjected to U.V. spectrophotometric analyses whereby the absorptions at 275 millimicrons are determined. Among the four values thus obtained for each compound tested those deriving from tube numbers 1 and 2 serve as controls, being representative of absorption due to peptides produced by incubation of uninhibited enzyme and substrates superimposed upon absorption due to compound itself, whereas those deriving from tube numbers 3 and 4—so called "treats"—represent absorption due to peptides produced by incubation of enzyme and substrate in the presence of compound, superimposed upon absorption due to compound itself. A compound is considered pepsin-inhibiting if the mean treat value (treat) is significantly ($P \leq 0.05$, Student's t-test) less than the mean control value (control) therefor. Pepsin is known to play a causal role in the production of peptic ulcer.

The invention will appear more fully from the examples which follow. These examples are set forth by way of illustration only and it will be understood that the invention is not to be construed as limited thereby either in spirit or in scope as many modifications both in materials and methods will be apparent from this disclosure to those skilled in the art. In these examples temperatures are given in degrees centigrade (° C.) and quantities of materials in parts by weight unless otherwise noted.

EXAMPLE 1

To a mixture consisting of 5.4 parts of 2-hydroxy-7α-methylestra-1,3,5(10)-trien-17-one, 3.5 parts of dihydropyran and 70 parts of benzene is added 0.015 part of p-toluenesulfonic acid monohydrate and the resulting reaction mixture is stirred at room temperature for about 90 minutes. At the end of that time 0.2 part of pyridine is added and the mixture is stripped of solvent by distillation under reduced pressure. Purification of the resulting solid residue by recrystallization from aqueous acetone affords pure 7α-methyl-3-tetrahydropyran-2'-yloxyestra-1,3,5(10)-trien-17-one, melting at about 152–155°.

EXAMPLE 2

To a mixture containing 2.07 parts of magnesium turnings, 0.11 part of powdered mercuric chloride and 70 parts of ether, stirred and cooled at 0–5°, is added a solution of 9.36 parts of 1-bromo-2-butyne in 70 parts of ether. During the latter addition a crystal of iodine is added in order to initiate the reaction. After completion of the addition the mixture is stirred for about 1 hour with continuous cooling. At the end of that time a solution of 6.3 parts of 7α - methyl-3-tetrahydropyran-2'-yloxyestra-1,3,5 (10)-trien-17-one in 45 parts of tetrahydrofuran is added dropwise over a period of about 1 hour with cooling. The resulting reaction mixture is stirred at 0–5° for about 1 hour, then at room temperature for about 1 hour and is finally heated at the reflux temperature for about 16 hours. After completion of that reaction period, the mixture is cooled and diluted with excess saturated aqueous ammonium chloride. The organic layer is separated, washed with water, dried over anhydrous calcium sulfate containining decolorizing carbon and stripped of solvent under pressure, thus affording, as an oil, 17α-(2-butynyl)-7α-methylestra - 1,3,5(10) - triene-3,17β-diol 3-tetrahydropyran-2'-yl ether.

EXAMPLE 3

To a solution of 6.5 parts of 17α-(2-butynyl)-7α-methylestra - 1,3,5(10) - triene-3,17β-diol 3-tetrahydropyran-2'-yl ether in 160 parts of methanol is added 0.2 part of p-toluenesulfonic acid monohydrate and that reaction mixture is kept at room temperature for about 45 minutes. The reaction mixture is then neutralized by the addition of 1 part of pyridine and the solvent is removed by distillation under reduced pressure. The resulting oily residue is chromatographed on a silica gel column and eluated with 5% ethyl acetate in benzene. The eluated material is further purified by recrystallization from methanol-ethyl acetate, thus affording 17α-(2-butynyl)-7α-methylestera-1,3,5 (10) - triene-3,17β-diol, melting with decomposition at about 265°. This compound is represented by the following structural formula

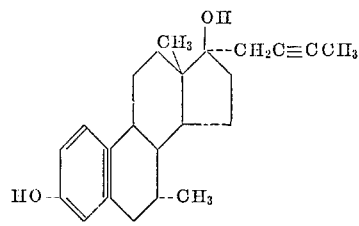

EXAMPLE 4

A mixture consisting of 3.5 parts of 17α-(2-butynyl)-7α - methylestra - 1,3,5(10)-triene-3,17β-diol, 20 parts of acetic anhydride and 40 parts of pyridine is stored at room temperature for about 1 hour, then is poured carefully into water. The resulting aqueous solution is extracted with ether and the organic solution is separated, washed successively with water, dilute acetic acid, dilute aqueous sodium bicarbonate and water, then dried over anhydrous sodium sulfate containing decolorizing carbon and stripped of solvent by distillation under reduced pressure. The initially oily residue solidifies upon standing and is purified by recrystallization from hexane-ethyl acetate, thus producing 17α - (2-butynyl)-7α-methylestra-1,3,5(10)-triene- 3,17β - diol 3-acetate, melting at about 139–141°. This compound is further characterized by an optical rotation of +40.5° and also by the following structural formula

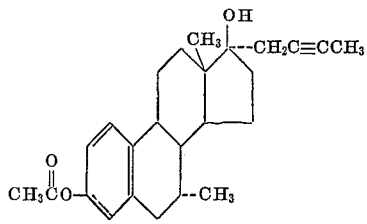

EXAMPLE 5

When an equivalent quantity of 1-bromo-2-pentyne is substituted in the procedure of Example 2, there is produced 7α - methyl - 17α-(2 - pentynyl)estra-1,3,5(10)- triene-3,17β-diol 3-tetrahydropyran-2'-yl ether.

EXAMPLE 6

The substitution of an equivalent quantity of 7α-methyl- 17α - (2 - pentynyl)estra - 1,3,5(10)-triene-3,17β-diol 3- 17β-diol 3-tetrahydropyran-2'-yl ether in the procedure of Example 3 results in 7α-methyl-17α-(2-pentynyl)estra-1, 3,5(10)-triene-3,17β-diol.

EXAMPLE 7

A mixture containing 2 parts of 7α - methyl-17α-(2-pentynyl)estra - 1,3,5(10 - triene-3,17β-diol, 20 parts of acetic anhydride and 40 parts of pyridine is heated on a steam bath for about 4 hours, then is cooled and carefully diluted with water. The resulting aqueous mixture is extracted with ether and the ether solution is separated, then washed successively with water, dilute acetic acid, dilute aqueous sodium bicarbonate and water. Drying over anhydrous sodium sulfate containing decolorizing carbon followed by removal of the solvent by distillation under reduced pressure results in 7α-methyl-17α-(2-pentynyl) estra-1,3,5(10)-triene-3,17β-diol 3,17-diacetate.

EXAMPLE 8

When equivalent quantities of 17α - (2-butynyl)-7α- methylestra - 1,3,5(10) - triene-3,17β-diol and propionic anhydride are substituted in the procedure of Example 7, there is obtained 17α - (2-butynyl)-7α-methylestra-1,3,5 (10)-triene-3,17β-diol 3,17-dipropionate.

EXAMPLE 9

By substituting an equivalent quantity of 7α-methyl- 17α - (2 - pentynyl)estra - 1,3,5(10) - triene - 3,17β-diol and otherwise proceeding according to the processes described in Example 4, there is obtained 7α-methyl-17α- (2-pentynyl)estra-1,3,5(10-triene-3,17β-diol 3-acetate.

EXAMPLE 10

The substitution of an equivalent quantity of propionic anhydride in the procedure of Example 4 results in 17α- (2-butynyl) - 7α - methylestra - 1,3,5(10) - triene - 3,17β- diol 3-propionate.

What is claimed is:
1. A compound of the formula

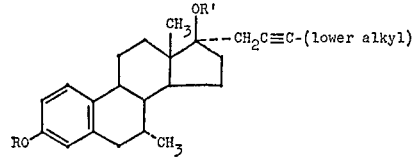

wherein R is selected from the group consisting of hydrogen and a lower alkanoyl radical, R' is hydrogen when R is hydrogen and R' is hydrogen or a lower alkanoyl radical when R is a lower alkanoyl radical.

2. As in claim 1, a compound of the formula

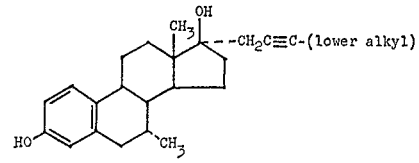

3. As in claim 1, a compound of the formula

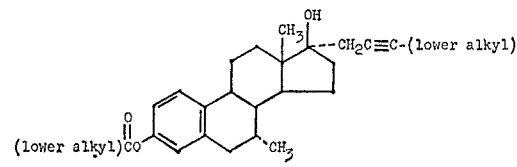

4. As in claim 1, a compound of the formula

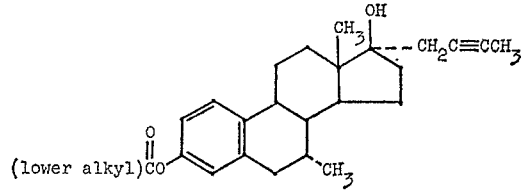

5. As in claim 1, the compound which is 17α-(2-butynyl)-7α-methylestra-1,3,5(10)-triene-3,17β-diol.

6. As in claim 1, the compound which is 17α-(2-butynyl) - 7α - methylestra - 1,3,5(10 - triene - 3,17β - diol 3-acetate.

References Cited

UNITED STATES PATENTS 3,210,390    10/1965    Meloy.

FOREIGN PATENTS 1,434,174         France _____ 260—397.5

OTHER REFERENCES

Elton et al., "Experientia" (1966), vol. 7, pp. 437–439.

ELBERT L. ROBERTS, Primary Examiner

U.S. Cl. X.R.

260—239.55

UNITED STATES PATENT OFFICE
CERTIFICATE OF CORRECTION

Patent No. 3,641,068　　　　　　　　Dated February 8, 1972

Inventor(s) Paul D. Klimstra

It is certified that error appears in the above-identified patent and that said Letters Patent are hereby corrected as shown below:

Column 1, formula

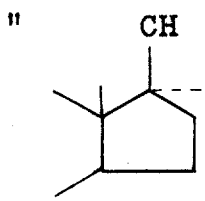　should be　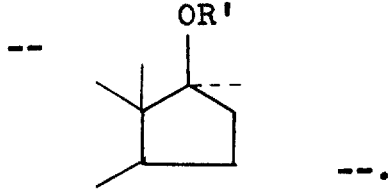

Column 1, line 46, "pentyl, heptyl" should be -- pentyl, hexyl, heptyl --.

Column 1, line 48, "ankanoyl" should be -- alkanoyl --.

Column 1, line 65, "1,3,5(10-" should be -- 1,3,5(10)- --.

Column 1, line 72, "2,17β" should be -- 3,17β --.

Column 2, line 26, "in injected" should be -- is injected --.

Column 2, line 53, "esponse" should be -- response --.

Column 3, lines 16,17, "before and immediately before and" should be -- before and --.

Column 4, line 6, "2-hydroxy" should be -- 3-hydroxy --.

UNITED STATES PATENT OFFICE
CERTIFICATE OF CORRECTION

Patent No. 3,641,068　　　　　　　　　Dated February 8, 1972

Inventor(s)　　　　Paul D. Klimstra

It is certified that error appears in the above-identified patent and that said Letters Patent are hereby corrected as shown below:

Column 4, line 36, "containining" should be -- containing --.

Column 5, lines 30,31, "diol 3-17β-diol 3-" should be -- diol 3- --.

Column 5, line 37, "1,3,5(10-" should be -- 1,3,5(10)- --.

Column 5, line 61, "1,3,5(10-" should be -- 1,3,5(10)- --.

Column 6, line 50, "1,3,5(10-" should be -- 1,3,5(10)- --.

Signed and sealed this 18th day of July 1972.

(SEAL)
Attest:

EDWARD M. FLETCHER, JR.　　　　　　ROBERT GOTTSCHALK
Attesting Officer　　　　　　　　　Commissioner of Patents